United States Patent
Pettipiece

(10) Patent No.: US 6,783,579 B2
(45) Date of Patent: Aug. 31, 2004

(54) COMBINED AIR CLEANER RESONATOR

(75) Inventor: Jason Pettipiece, Chatham (CA)

(73) Assignee: Siemens VDO Automotive Inc., Chatham, CA (US)

( * ) Notice: Subject to any disclaimer, the term of this patent is extended or adjusted under 35 U.S.C. 154(b) by 0 days.

(21) Appl. No.: 10/272,572

(22) Filed: Oct. 16, 2002

(65) Prior Publication Data

US 2003/0126841 A1 Jul. 10, 2003

Related U.S. Application Data

(60) Provisional application No. 60/346,912, filed on Jan. 4, 2002.

(51) Int. Cl.$^7$ ............................................. B01D 35/00
(52) U.S. Cl. .................... 96/384; 55/385.3; 55/503; 123/184.57; 123/198 E
(58) Field of Search ................... 96/384, 380, 386, 96/388; 55/497, 503, 385.3; 123/184.57, 198 E

(56) References Cited

U.S. PATENT DOCUMENTS

| 5,792,247 | A | * | 8/1998 | Gillingham et al. | .......... 96/386 |
| 5,865,863 | A | | 2/1999 | DeSousa et al. | |
| 6,167,862 | B1 | | 1/2001 | Powell et al. | |
| 6,299,661 | B1 | | 10/2001 | Bloomer | |
| 6,309,451 | B1 | | 10/2001 | Chen | |
| 6,530,984 | B2 | * | 3/2003 | Stuart | .......... 96/380 |

* cited by examiner

*Primary Examiner*—Robert A. Hopkins

(57) ABSTRACT

An air cleaner assembly 10 includes a filter located within a housing 12 between an air inlet 20 and outlet 22 for filtering airflow therebetween. The air inlet 20 extends from the housing 12 to communicate with an air intake port located at a vehicle location where fresh air is available. A resonator device 28 is mounted within the housing 12. The resonator device 12 includes a resonator volume 30 and a tuning neck 32. The resonator volume 30 fits into the housing 12 to reduce bulk and readily lend itself to adaptation to space requirements. The tuning neck 32 is mounted within the outlet 22 such that noise and vibration are communicated directly to the resonator device 28.

9 Claims, 2 Drawing Sheets

COMBINED AIR CLEANER RESONATOR

The present application claims priority to U.S. Provisional Patent Application Serial No. 60/346,912, filed Jan. 4, 2002.

BACKGROUND OF THE INVENTION

The present invention relates to an air introduction body, and more particularly to a vehicle air cleaner having an in-line resonator.

Manufacturers have employed various methods to reduce engine noise within a vehicle passenger compartment. Such noise frequently emanates from the engine, travels through the air induction system, and emanates into the passenger compartment.

Typically, a resonator chamber device communicates with the air induction system in order to reduce engine noise. The resonator device is mounted perpendicular to a vehicle induction system flow conduit. The resonator requires additional packaging space which may be at a premium in some vehicle installations.

Resonator devices include both expansion chamber and Helmholtz resonators which are designed to attenuate noise in particular frequency ranges. In an effort to simplify the air induction system and lower costs, the air cleaner sometimes includes a resonator chamber in the housing into which the air cleaner element is installed. Even where a resonator is integrated into an air cleaner housing, the resonator device comprises a separate component which must be connected into the induction system typically using hoses and clamps or otherwise requires a rather complicated communication path to achieve the perpendicular orientation.

Accordingly, it is desirable to provide an effective resonator system which requires minimum packaging space for utilization in relatively small locations.

SUMMARY OF THE INVENTION

The air cleaner assembly according to the present invention provides a housing constructed from a cover and a base. A filter such as a planar air filter is located within the housing between an air inlet and outlet thereby filtering airflow therebetween. The air inlet extends from the housing to communicate with an air intake port typically located at a vehicle location where fresh air is available.

A resonator device such as a Helmholtz device is mounted within the housing. The resonator device includes a resonator volume and a tuning neck. The resonator volume fits into the housing to reduce bulk and readily lend itself to adaptation to the space requirements. The tuning neck is mounted within and along an axis defined by the outlet. As the tuning neck is mounted within the outlet, noise and vibration are communicated directly to the resonator device to attenuate vehicle noise and vibrations without impacting the system packaging space. Moreover, no external connections are required to mount the resonator device into the air introduction system as heretofore required.

The present invention therefore provide an effective resonator system which requires minimum packaging space for utilization in relatively small locations.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
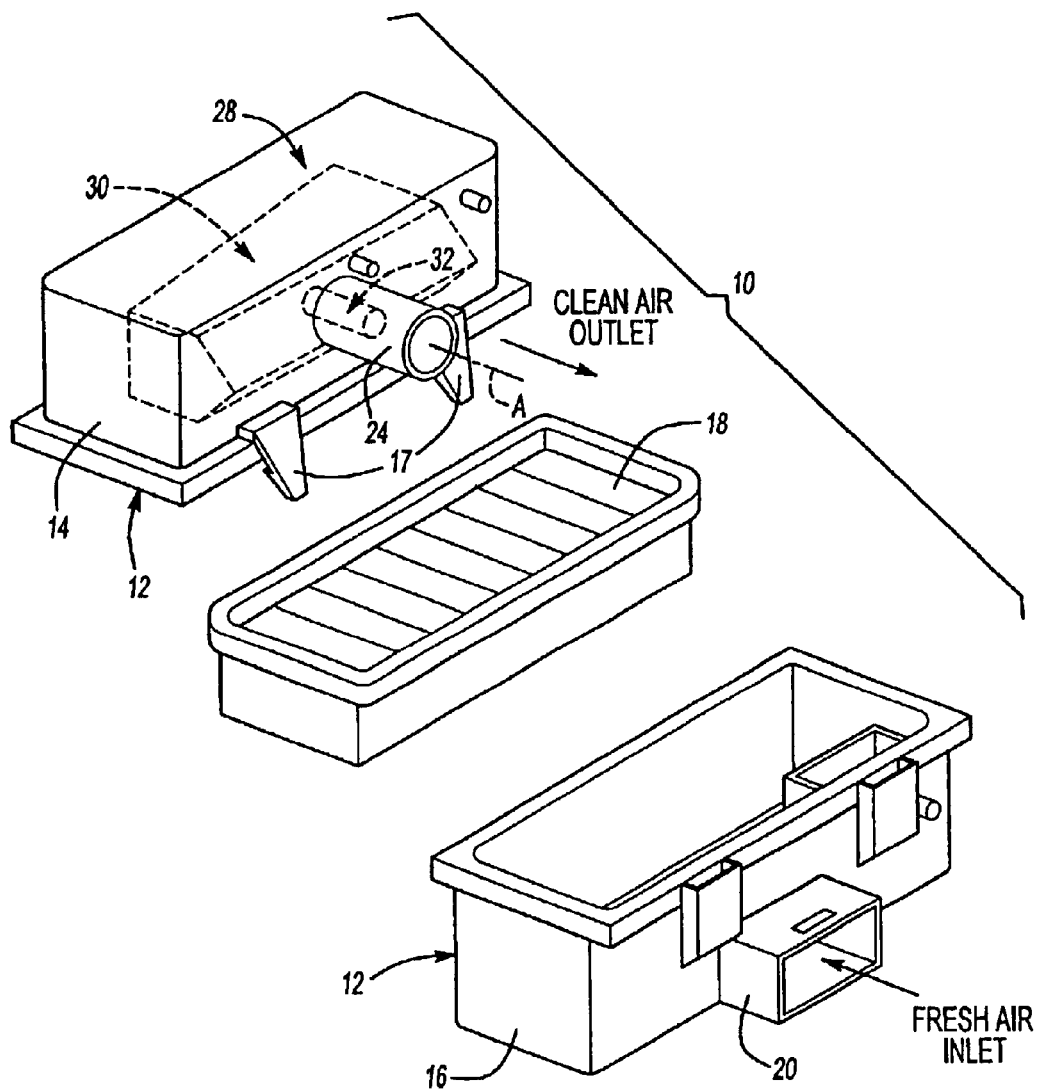
FIG. 1 is an exploded view of an air introduction system according to the present invention.

FIG. 1 illustrates a general exploded view of an air introduction body 10 such as an air cleaner assembly 10 according to the present invention. The air cleaner assembly 10 includes a housing 12 which defines an interior space preferably constructed from a cover 14 and a base 16. The cover 14 and base 16 are mounted together through one or more clips 17 or the like to form a unitary box-like structure. It should be understood that other shapes will benefit from the present invention.

The cover 14 and base 16 may be of a molded plastic such as nylon or polypropylene, and may be reinforced as required for a particular application. That is, the shape and size of the housing 12 are contemplated as being closely matched to the vehicle compartment in which they are located.

Figure 2:
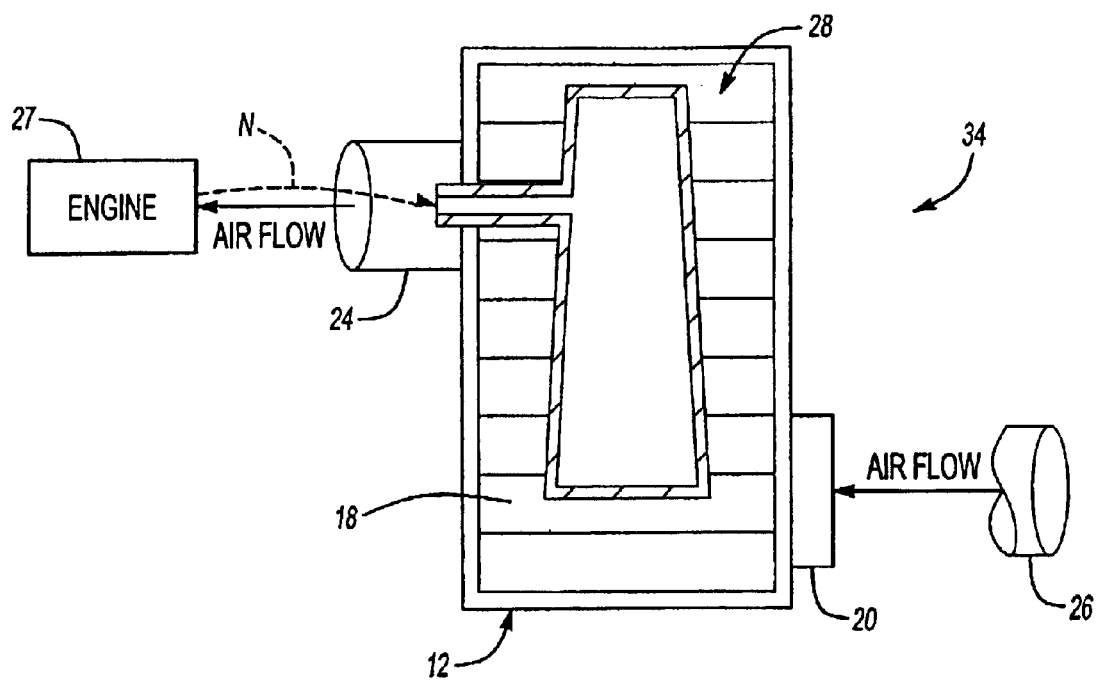
FIG. 2 is general schematic view of an air introduction system according to the present invention.

A filter 18 such as a planar air filter is located within the housing 12 between an air inlet 20 and outlet 22 thereby filtering airflow therebetween. The air inlet 20 extends from the housing 12 to communicate with an air intake port 26 (FIG. 2) typically located at a vehicle location where fresh air is available. The air inlet 20 preferably extends from the base 16 of the housing 12. The outlet 24 extends from the cover 14 to communicate filtered air from the inlet 20 to a vehicle power plant (illustrated schematically at 27; FIG. 2). It should be understood that other arrangements in which a filter is located between and inlet and outlet will benefit from the present invention.

A resonator device 28 such as a Helmholtz device is mounted within the housing 12, preferably in the cover 14. As generally, known, the resonator device 28 is typically tuned to attenuate vehicle noise and vibrations.

The resonator device 28 includes a resonator volume 30 and a tuning neck 32. The resonator volume 30 fits into the cover 14 to reduce bulk and readily lends itself to adaptation to the space requirements of any housing 12. The tuning neck 32 is preferably mounted within and along an axis A define by the outlet 24. That is, the tuning neck 32 is mounted at least partially within the outlet 24.

Referring to FIG. 2, an air introduction system 34 including the air introduction body 10 intakes ambient air from the air intake port 26, filters the air through filter 18 and communicate the clean airflow to the vehicle power plant 27. As known, noise and vibration (illustrated schematically by arrow N) from the vehicle power plant 27 emanates through the air introduction system 34. As the tuning neck 32 is mounted within the outlet 24, noise and vibration N are communicated directly to the resonator device 28. The resonator device 28 is therefore positioned to attenuate vehicle noise and vibrations without impacting the system packaging space. Moreover, no external connections are required to mount the resonator device 28 into the air introduction system 34 as heretofore required.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air introduction body for a vehicle air introduction system comprising:

an air cleaner housing comprising a cover and a base, said base comprising an inlet and said cover comprising and outlet; and a resonator device mounted within said cover, said resonator device comprising a tuning neck located at least partially within said outlet.

2. The air cleaner assembly as recited in claim 1, wherein said resonator comprises a resonator volume located within said housing.

3. The air cleaner assembly as recited in claim 2, wherein said tuning neck is substantially perpendicular to said resonator volume.

4. The air cleaner assembly as recited in claim 1, wherein said inlet and said tuning neck are substantially parallel.

5. A vehicle intake system comprising:

an air cleaner housing comprising a cover and a base, said base comprising an inlet and said cover comprising an outlet; and a resonator device mounted within said cover, said resonator device comprising a tuning neck located at least partially within said inlet outlet.

6. The air clener assembly as recited in claim 5, wherein said resonator comprises a resonator volume located within said air cleaner housing.

7. A The air cleaner assembly as recited in claim 5, wherein said tuning neck is substantially perpendicular to said resonator volume.

8. The air cleaner assembly as recited in claim 5, wherein said inlet and said tuning neck are located along a common axis.

9. The air cleaner assembly as recited in claim 5, wherein said air cleaner housing comprises a cover and a base, said resonator device mounted within said cover.

* * * * *